United States Patent
Schone

(10) Patent No.: US 8,280,751 B1
(45) Date of Patent: Oct. 2, 2012

(54) SYSTEM AND METHOD FOR REDUCED INITIAL PAYMENT OPTION

(75) Inventor: Steve Schone, Dacula, GA (US)

(73) Assignee: United Services Automobile Association (USAA), San Antonio, TX (US)

( * ) Notice: Subject to any disclaimer, the term of this patent is extended or adjusted under 35 U.S.C. 154(b) by 951 days.

(21) Appl. No.: 11/321,241

(22) Filed: Dec. 29, 2005

(51) Int. Cl.
*G06Q 40/00* (2006.01)

(52) U.S. Cl. ............................... 705/4; 705/35

(58) Field of Classification Search .............. 705/4, 35
See application file for complete search history.

(56) References Cited

U.S. PATENT DOCUMENTS

| | | | |
|---|---|---|---|
| 5,966,698 A | 10/1999 | Pollin | |
| 6,073,124 A | 6/2000 | Krishnan et al. | |
| 6,105,007 A | 8/2000 | Norris | |
| 6,629,081 B1 | 9/2003 | Cornelius et al. | |
| 6,785,534 B2 | 8/2004 | Ung | |
| 6,807,533 B1 | 10/2004 | Land et al. | |
| 6,938,008 B1 | 8/2005 | Stokes | |
| 6,980,968 B1 * | 12/2005 | Walker et al. | 705/38 |
| 2001/0001148 A1 | 5/2001 | Martin et al. | |
| 2001/0023414 A1 | 9/2001 | Kumar et al. | |
| 2002/0087344 A1 | 7/2002 | Billings et al. | |
| 2002/0143701 A1 | 10/2002 | Maguire et al. | |
| 2002/0147663 A1 | 10/2002 | Walker et al. | |
| 2003/0083907 A1 | 5/2003 | Sato | |
| 2003/0093302 A1 * | 5/2003 | Quido et al. | 705/4 |
| 2003/0225685 A1 | 12/2003 | Dickerson | |
| 2004/0225606 A1 | 11/2004 | Nguyen et al. | |
| 2005/0228750 A1 | 10/2005 | Olliphant et al. | |
| 2007/0118476 A1 | 5/2007 | Likourezos et al. | |

OTHER PUBLICATIONS

Steve E. Swenson, "Federal Loan Consolidation Program can help students repay loans", Feb. 27, 2005, Knight Ridder Tribune Business News, Washington, p. 1.*
Guttentag, Jack M; Redstone, Allan J. "Temporary buydowns and Affordability"; Fall, 1994, Journal of the American Real Estate & Urban Economics Association, v22, n3, p. 479(18); ISSN: 0270-0484.*
Business Wire; "Prudential Investments Introduces Strategic Partners Annuity One; New Variable Annuity Offers Investors World-Class Money Managers and Flexible Product Features"; p. 2364; Oct. 9, 2000, Newswire.*
Lankford, Kimberly et al., "The Lowdown on Premiums", Kiplinger's Personal Finance, Washington Jun. 2003, vol. 57, Issue 6, pp. 72-77.
Gio, "Pay-By-The-Month-Personal Insurance", viewed at http://www.gio.com/payments/paybythemonth.htm., Archive date Oct. 29, 2005.
"Brits Missing Out on Billions in Bill Discounts", viewed at http://www.bacs.co.uk/BACS/Press/Press+releases/2005/Brits+missing+out+on+billions+in+bill+discounts+16-062005.htm.

* cited by examiner

*Primary Examiner* — Lalita M Hamilton
*Assistant Examiner* — Edward Chang
(74) *Attorney, Agent, or Firm* — Brooks, Cameron & Huebsch, PLLC

(57) ABSTRACT

Various embodiments of the present disclosure are directed to systems and methods for providing a reduced initial payment option. The systems and methods provide for the determination of a plurality of payment options including a reduced initial payment option.

21 Claims, 5 Drawing Sheets

SYSTEM AND METHOD FOR REDUCED INITIAL PAYMENT OPTION

This application is related to 1) U.S. application Ser. No. 11/321,240 filed on Dec. 29, 2005, and 2) U.S. application Ser. No. 11/321,912 filed Dec. 29, 2005, which are incorporated herein by reference in their entirety.

TECHNICAL FIELD

Various embodiments of the present disclosure pertain to payment plans and options and, more particularly, to a system and method for reduced initial payment options.

BACKGROUND

An insurance policy can be a very wise purchase, but it can also be expensive or out of reach for certain segments of consumers. In order to make insurance policies more affordable, some insurance companies have introduced an insurance premium payment plan that requires an initial down payment of a certain percentage, such as 30% of the full period premium rather than a full payment of the premium up front. However, this may still present an insurmountable financial obstacle for some consumers.

SUMMARY

Various embodiments of the present disclosure are directed to systems and methods for providing a reduced initial payment option. The systems and methods provide for the determination of a plurality of payment options including a reduced initial payment option.

DETAILED DESCRIPTION

Figure 1:
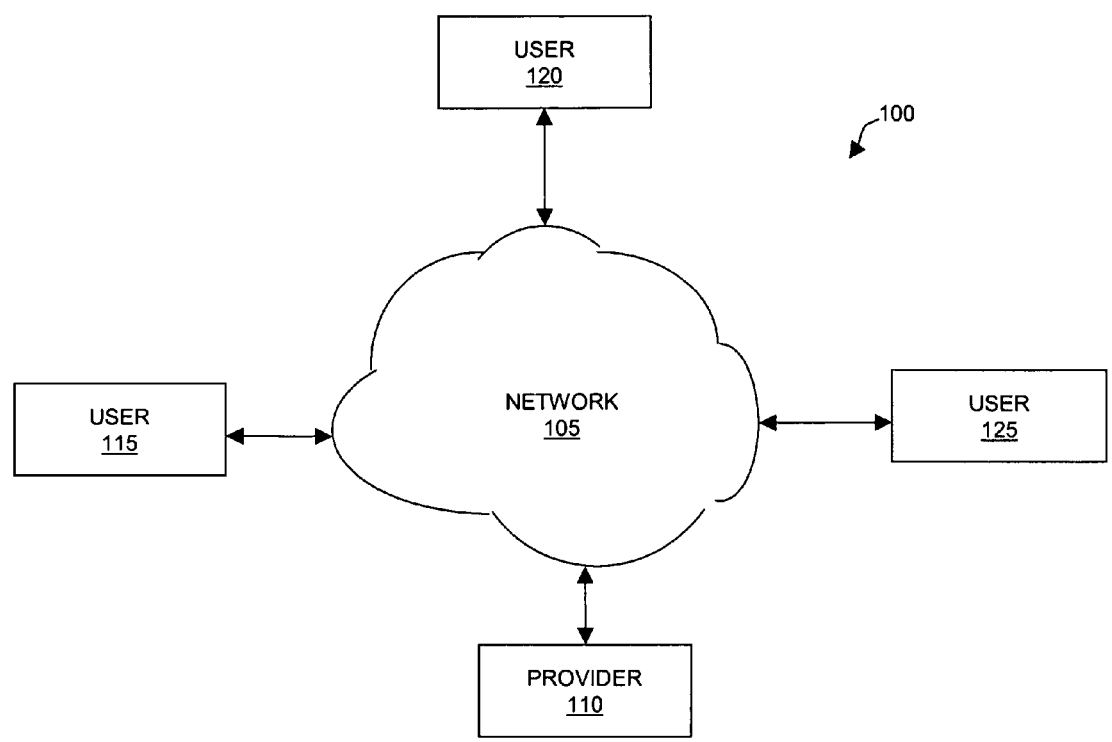
FIG. 1 is a block diagram of a system according to an illustrative embodiment.

FIG. 1 is a block diagram of a system, indicated generally at 100 according to the illustrative embodiment. The system 100 includes a computer network 105 such as, for example, a Transport Control Protocol/Internet Protocol ("TCP/IP") network (e.g., the Internet or an intranet). A provider 110 is operably coupled to the network 105. A plurality of users (or customers or consumers) 115, 120, and 125 are also operably coupled to the network 105 in order to allow communication between the users 115, 120, and 125 and the provider 110.

Each of the provider 110 and the users 115, 120, and 125 includes a respective network interface for communicating with the network 105 (e.g., outputting information to, and receiving information from, the network 105), such as by transferring information (e.g., instructions, data, signals) between such users and the network 105. Accordingly, through the network 105, the provider 110 communicates with the users 115, 120, and 125, and the users 115, 120, and 125 communicate with the provider 110.

For clarity, FIG. 1 depicts only one provider 110. However, the system 100 may include a plurality of providers which are substantially identical to the provider 110 and each other. Likewise, for clarity, FIG. 1 depicts only three users 115, 120, and 125. However, the system 100 may include a plurality of users which are substantially identical to the users 115, 120, and 125 and each other. In the discussion below, the user 115 is a representative one of the users 115, 120, and 125.

Each of the provider 110 and the users 115, 120, and 125 includes a respective information handling system (IHS), a subsystem, or a part of a subsystem for executing processes and performing operations (e.g., processing or communicating information) in response thereto, as discussed further below. Each such IHS is formed by various electronic circuitry components (hardware) and/or software. Moreover, as illustrated in FIG. 1, such IHSs may be coupled to each other. Accordingly, the provider 110 and the users 115, 120, and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g. the network 105).

Figure 2:
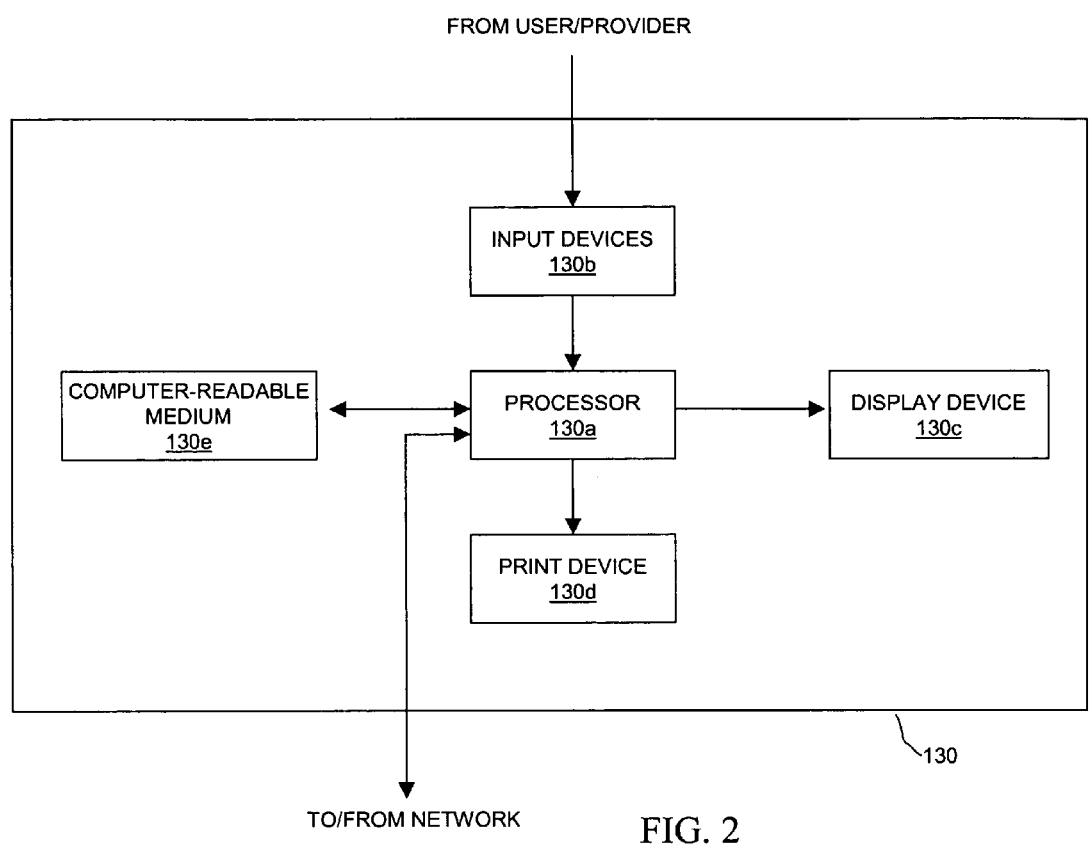
FIG. 2 is a block diagram of a representative information handling system ("IHS") of FIG. 1.

Referring now to FIG. 2, an IHS 130 which is representative of one of the IHS's described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), (e) a computer readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read-only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer readable medium 130e, as illustrated in FIG. 2.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d prints visual images on paper.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer readable medium 130e and the processor 130a are structurally and functionally interrelated with one another as described below in further detail. Each IHS of the illustrative embodiment is structurally and functionally interrelated with a respective computer-readable medium, similar to the manner in which the processor 130a is structurally and functionally interrelated with the computer-readable medium 130e. In that regard, the computer-readable medium 130e is a representative one of such computer-readable media including, for example, but not limited to, a hard disk drive.

The computer-readable medium 130e stores (e.g., encodes, records, or embodies) functional descriptive material (e.g., including but not limited to software (also referred to as computer programs or applications) or data structures). Such functional descriptive material imparts functionality when encoded on the computer-readable medium 130e. Also, such functional descriptive material is structurally and functionally interrelated to the computer-readable medium 130e.

With such functional descriptive material, data structures define structural and functional interrelationships between such data structures and the computer-readable medium 130e (and other aspects of the system 100). Such interrelationships permit the data structures' functionality to be realized. Also, within such functional descriptive material, computer programs define structural and functional interrelationships between such computer programs and the computer readable medium 130e (and other aspects of the system 100). Such interrelationships permit the computer programs' functionality to be realized.

For example, the processor 130a reads (e.g., accesses or copies) such functional descriptive material from the computer readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer-readable medium) for causing the processor 130a to perform additional operations (as described elsewhere herein). Accordingly, such functional descriptive material exhibits a functional interrelationship with the way in which processor 130a executes its processes and performs its operations.

Further, the computer-readable medium 130e is an apparatus from which the computer application is accessible by the processor 130a, and the computer application is processable by the processor 130a for causing the processor 130a to perform such additional operations. In addition to reading such functional descriptive material from the computer-readable medium 130e, the processor 130a is capable of reading such functional descriptive material from (or through) the network 105 which is also a computer-readable medium (or apparatus). Moreover, the memory device of the IHS 130 is itself a computer-readable medium (or apparatus).

Figure 3:
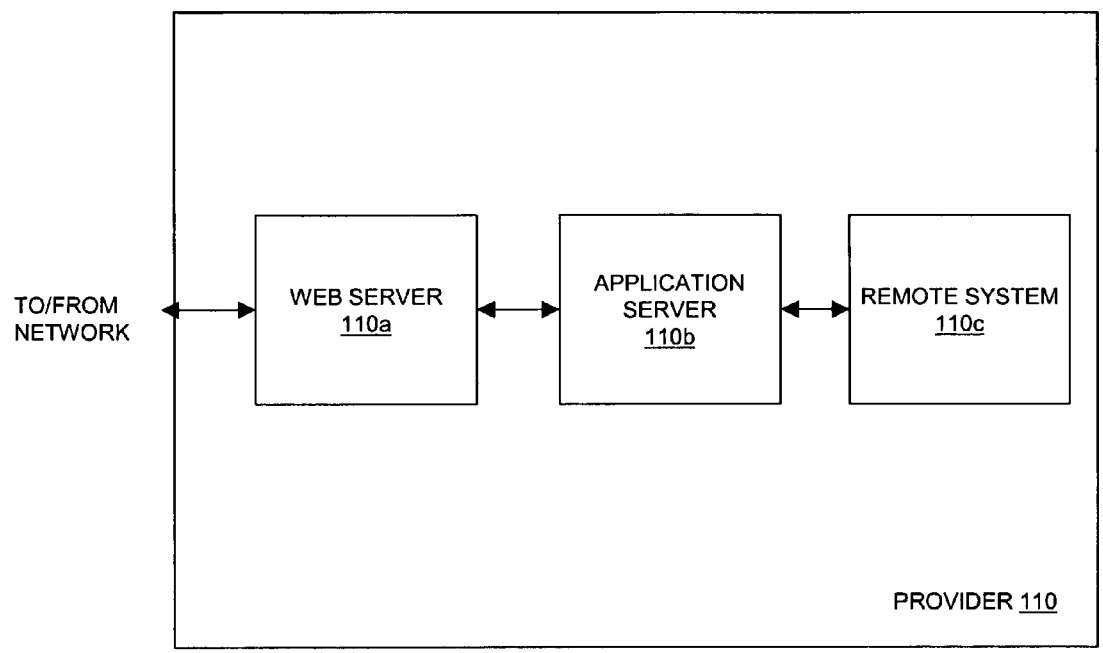
FIG. 3 is a block diagram of an embodiment of an application server used in the provider of FIG. 2.

Referring now to FIG. 3, the provider 110 is shown in more detail. A web server 110a such as, for example, a HyperText Transfer Protocol (HTTP) server, is included in the provider 110 and is operably coupled to the network 105, described above with reference to FIG. 1. An application server 110b, which may be the IHS 130 or which may include some or all of the components of the IHS 130, described above with reference to FIG. 2, is included in the provider 110 and is operably coupled to the web server 110a. A remote system 110c such as, for example, a data source, a java database connectivity (JDBC) or a Java connector architecture (J2C), is included in the provider 110 and is operably coupled to the application server 110b. In an embodiment, the remote system 110c may be located outside of the provider 110 but still operably coupled to the provider 110 and the application server 110b.

In operation, the provider 110 provides a reduced initial payment option to one or more consumers or customers 115-125. Examples of the provider 110 include an insurance company, a credit card issuer, a bank, a credit union, a financial institution, a financial services entity, a mortgage company, a retail store, an airline, a car rental business, a hotel, a motel, an Internet service provider, a software manufacturer, a computer hardware manufacturer, a food-service business, an automobile manufacturer, an automobile retailer, and any other provider who may advantageously extend an offer of a reduced initial payment to its consumers or customers. Examples of the customer includes a person, a business legal entity, and a non-business legal entity. As a condition of the reduced initial payment option, the provider 110 requires the customer to agree to an automatic payment plan whereby subsequent installment payments are automatically withdrawn from the customer's bank account or against a bank card. In this manner, the provider receives up-front payment prior to activating the insurance policy. If the customer is unwilling or unable to make a 30% initial payment, the provider is still able to offer the service to the customer while having the added protection of the automatic payment plan for subsequent payments on the premium.

Figure 4:
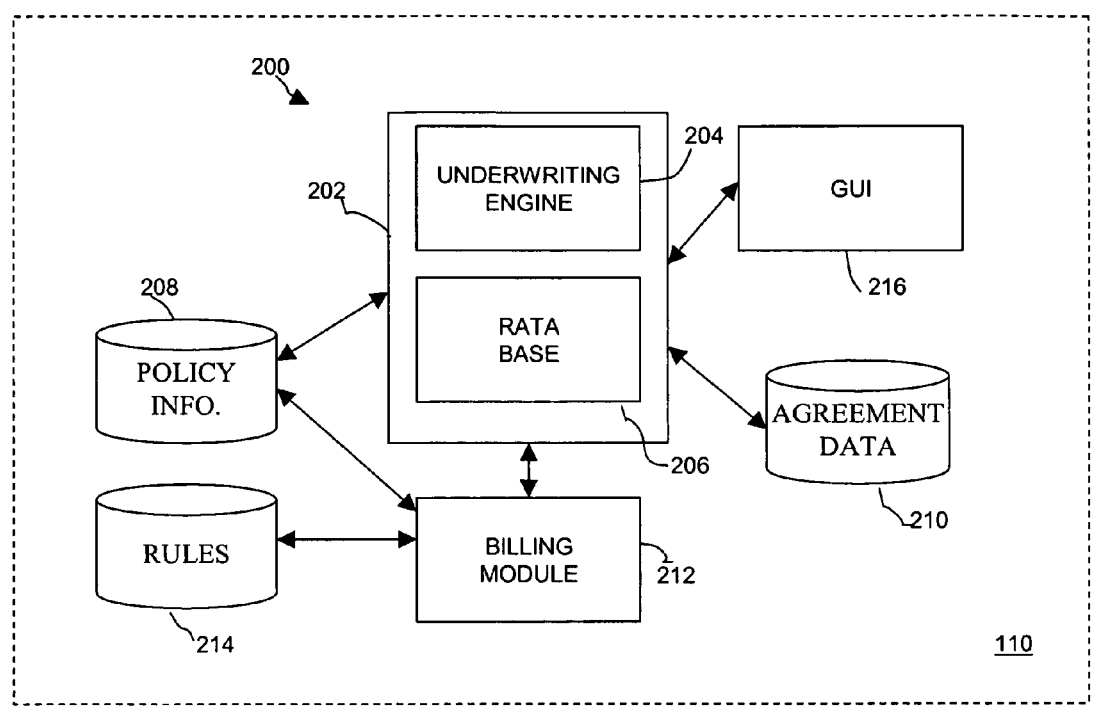
FIG. 4 is a simplified block diagram of an embodiment of a reduced initial payment option system.

FIG. 4 is a simplified block diagram of an embodiment of a reduced initial payment option system 200. The system 200 comprises a quoting module 202 that includes two components—an underwriting engine 204 and a rata base 206. The underwriting engine 204 is operable to generate premium rate data based on the data related to the specific user making the purchase. This type of data may include the location, number of vehicles, insurance score, driving and claim record, age of operators, tenure with the insurance provider, time in the current job class, payment record, prior insurance, eligibility, license status (active or suspended), and years licensed, etc. The rata base 206 is operable to generate premium rate data based on information not specific to the user such as location, usage, limits of coverage, age of operators, marital status, number of vehicles, type of vehicle (age, make, model), discounts (good driving, driver training, etc.), driving and claims records, for example. Combined, the underwriting engine 204 and the rata base 206 generate a premium rate for the purchase. The quoting module 202 is communicably coupled to a policy information database 208, which stores and maintains data related to insurance premium policies offered by provider 110. The quoting module 202 is also communicably coupled to an agreement database 210, which stores and maintains data related to users who have existing or past transactions with the provider. The quoting module 202 is also communicably coupled to a billing module 212, which primarily performs the function of calculating payment schedules and generating invoices. The billing module 212 is communicably coupled to a rules database 214, which stores and maintains rules used to make payment calculations. The quoting module 202 is further communicably coupled to a graphical user interface (GUI) module 216 that is operable to display user menus, user options, and other information to the user in an easy-to-read format. The GUI module may be operable with a web browser application to display data and information in HTML or other suitable web browser formats.

Figure 5:
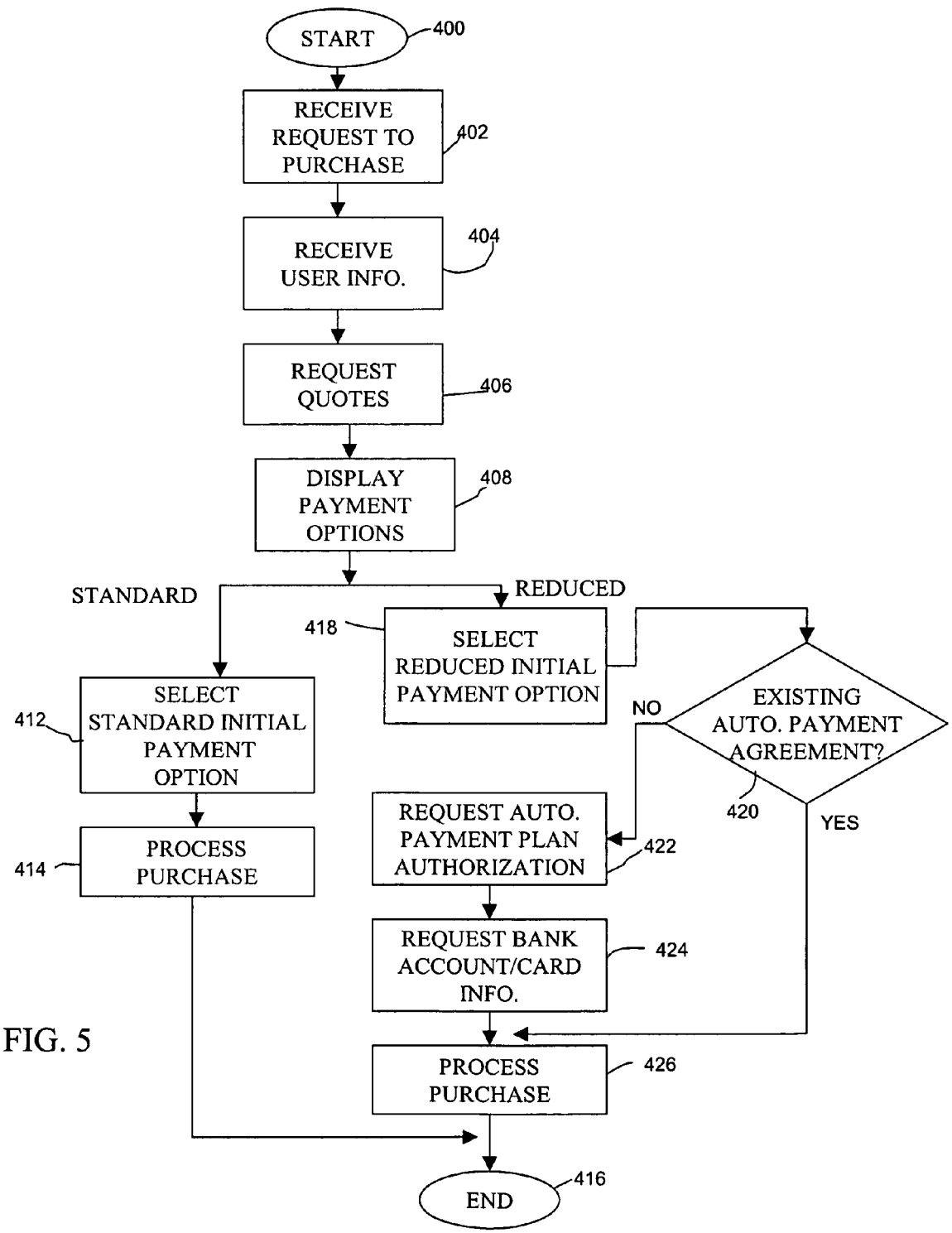
FIG. 5 is a flowchart of a process for reduced initial payment option.

FIG. 5 is a flowchart of a process 400 for reduced initial payment option. In step 402, a request is received at a provider for a purchase. The purchase may be for an insurance policy, a piece of merchandise, real estate, or some other property or instrument. The purchase request may be transmitted to the provider from a customer over the network or it may be a face-to-face request received from a customer. The purchase request may be accompanied with the user's data such as name, sex, age, the type of policy desired, the item to be insured (such as the year, make and model of the automobile). The user's data may alternatively be an account number if the user is an existing customer. The provider's quoting module 202 receives this user information in step 404.

The quoting module 202 then sends or transmits quote requests to the billing module 212 in step 406. The billing module 212 may iteratively perform calculations to provide one or more payment options to the quoting module 202. In response, the provider provides or displays a list of the payment options with the associated information received from the billing module 212 in step 408. The information displayed may include the amount of the initial payment and the amount and number of subsequent payments. The options includes a standard payment option that requires the customer to pay an initial payment of a predetermined percentage, usually 30%. An additional payment option is a reduced initial payment option that requires the customer to pay a reduced percentage of the premium if the customer agrees that the provider may make automatic periodic withdrawals for subsequent payments. For example, the reduced initial payment may be a first monthly or 30-day payment amount or a percentage much less than 30%. For example, if the purchase is for an insurance policy for a six month period, the initial reduced payment may be the premium for the first month (30 days) or 16% of the total premium for the policy.

The customer may then select the desired payment option for the purchase. The customer may indicate his/her selection by clicking on or touching the desired payment option on the screen. If the customer selects the standard payment option in step 412, then the purchase is processed normally in step 414. In this instance, the customer is asked to make an initial payment of 30% of the insurance premium to activate the insurance policy. Data related to this transaction are stored properly in the databases such as the agreement database 210. The process thus ends in step 416.

The customer may instead choose the reduced initial payment option in step 418. The quoting module 202 may then consult the agreement database 210 to determine whether the customer is an existing customer that already has an automatic payment agreement plan in place in step 420. If the customer does have an existing automatic payment agreement plan in place, then process 400 proceeds to step 426 and the purchase is processed. If the customer does not have an existing automatic payment plan, then process 400 requests the customer to agree to such a payment arrangement by displaying information about the automatic payment plan on the screen display in step 422. The GUI further provides a clickable button or some other form of user feedback for the customer to indicate agreement to the automatic payment plan. Once the customer gives his/her authorization, the provider requests bank account and/or bank card information that the automatic payments will be made from in step 424. Thereafter in step 426, the purchase may be processed to completion. Data related to this transaction are stored properly in the databases such as the agreement database 210.

While the detailed description above has been provided in the context of purchasing an automobile insurance policy, the system and method described herein are applicable to other purchases as well.

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A system comprising:
   one or more computing devices comprising a processor and a memory;
   a rules database executing on the one or more computing devices and comprising rules data used in a calculation of payment options by a billing module;
   an agreement database executing on the one or more computing devices and comprising agreement data related to users who have an automatic payment agreement plan in place; and
   a billing module executing on the one or more computing devices and operable to use the rules data to perform the calculation of payment options in order to provide a standard payment option and a reduced initial payment option, wherein:
   the standard payment option includes an initial payment that is a percentage of a total amount for an insurance policy and a number of payments subsequent to the initial payment, wherein the number of payments subsequent to the initial payment are not made by automatic periodic withdrawals that are part of an automatic payment agreement, and wherein a total of the initial payment and the number of payments subsequent to the initial payment equal the total amount for the insurance policy; and
   the reduced initial payment option includes a first payment that is a percentage of the total amount for the insurance policy that is less than the percentage of the standard amount option and a number of payments subsequent to the first payment, wherein the number of payments subsequent to the first payment are made by automatic periodic withdrawals that are part of an automatic payment agreement, and wherein a total of the first payment and the number of payments subsequent to the first payment equal the total amount for the insurance policy;
   a quoting module executing on the one or more computing devices and operable to:
   communicate an offer for the insurance policy, to a user, to complete a purchase using either the standard payment option or the reduced initial payment option;
   complete the purchase using the reduced initial payment option in response to either:
   receiving an automatic payment agreement associated with the purchase to provide automatic periodic withdrawals from an account for a number of payments that are subsequent to the first payment; or
   automatically determining that the user making the purchase is an existing customer having an existing automatic payment agreement plan by consulting the agreement database, in response to receiving a selection of the reduced initial payment option; and provide a product associated with the purchase in response to activating the insurance policy by receiving the first payment or the initial payment.

2. The system of claim 1, wherein the reduced initial payment option comprises a first payment that is 16% of the total amount to be paid by the user.

3. The system of claim 1, further comprising a policy information database comprising data related to insurance policies.

4. The system of claim 1, further comprising a graphical user interface operable to display the standard payment options and the reduced initial payment option to the user.

5. The system of claim 1, wherein the quoting module comprises an underwriting engine operable to provide insurance rate data in response to user-specific data.

6. The system of claim 1, wherein the quoting module comprises a database operable to provide insurance rate data in response to non-user specific data.

7. The system of claim 4, further comprising a web server operable to provide web pages of the graphical user interface to a user via a computer network.

8. A method comprising:
storing by a computer processor rules data used in a calculation of payment options by a billing module;
storing by a computer processor agreement data related to users who have an automatic payment agreement plan in place;
transmitting by a computer processor a quote request for an insurance policy from a user to the billing module, wherein the billing module is operable to use the rules data to perform the calculation of payments options in order to provide a standard payment option and a reduced initial payment option, wherein:
the standard payment option includes an initial payment that is a percentage of a total amount for the insurance policy and a number of payments subsequent to the initial payment, wherein the number of payments subsequent to the initial payment are not made by automatic periodic withdrawals that are part of an automatic payment agreement, and wherein a total of the initial payment and the number of payments subsequent to the initial payment equal the total amount for the insurance policy; and
the reduced initial payment option includes a first payment that is a percentage of the total amount for the insurance policy that is less than the percentage of the standard payment option and a number of payments subsequent to the first payment, wherein the number of payments subsequent to the first payment are made by automatic periodic withdrawals that are part of an automatic payment agreement, and wherein a total of the first payment and the number of payments subsequent to the first payment equal the total amount for the insurance policy;
communicating by a computer processor an offer for the insurance policy, to the user, to complete a purchase using either the standard payment option or the reduced initial payment option;
completing by a computer processor the purchase using the reduced initial payment option in response to either:
receiving an automatic payment agreement associated with the purchase to provide automatic periodic withdrawals from an account for a number of payments that are subsequent to the first payment; or
automatically determining that the user is an existing customer having an existing automatic payment agreement plan by consulting the agreement database, in response to receiving a selection of the reduced initial payment option
providing by a computer processor the insurance policy a that is the subject of the quote request to the user in response to receiving the first payment or the initial payment to activate the insurance policy.

9. The method of claim 8, wherein the providing the reduced initial payment option comprises requesting a first payment that is 16% of the total amount to be paid by the user.

10. The method of claim 8, further comprising storing policy information data related to insurance policies.

11. The method of claim 8, further comprising accepting a selection of the reduced initial payment option from the user.

12. The method of claim 8, further comprising providing insurance rate data to the billing module in response to user-specific data.

13. The method of claim 8, further comprising providing insurance rate data to the billing module in response to non-user-specific data.

14. The method of claim 8, further comprising providing a web page graphical interface and displaying an insurance premium payment option to a user via a computer network.

15. A computer-executable medium comprising computer-executable instructions for:
storing rules data used in a calculation of payment options by a billing module;
storing agreement data related to users who have an automatic payment agreement plan in place;
transmitting a quote request for an insurance policy from a user to the billing module, wherein the billing module is operable to use the rules data to perform the calculation of payments options in order to provide a standard payment option and a reduced initial payment option, wherein:
the standard payment option includes an initial payment that is a percentage of a total amount for the insurance policy and a number of payments subsequent to the initial payment, wherein the number of payments subsequent to the initial payment are not made by automatic periodic withdrawals that are part of an automatic payment agreement, and wherein a total of the initial payment and the number of payments subsequent to the initial payment equal the total amount for the insurance policy; and
the reduced initial payment option includes a first payment that is a percentage of the total amount for the insurance policy that is less than the percentage of the standard payment option and a number of payments subsequent to the first payment, wherein the number of payments subsequent to the first payment are made by automatic periodic withdrawals that are part of an automatic payment agreement, and wherein a total of the first payment and the number of payments subsequent to the first payment equal the total amount for the insurance policy;
communicating an offer for the insurance policy, to the user, to complete a purchase using either the standard payment option or the reduced initial payment option;
completing the purchase using the reduced initial payment option in response to either:
receiving an automatic payment agreement associated with the purchase to provide automatic periodic withdrawals from an account for a number of payments that are subsequent to the first payment; or automatically determining that the user is an existing customer having an existing automatic payment agreement plan by consulting the agreement database, in response to receiving a selection of the reduced initial payment option; and providing the insurance policy that is the subject of the quote request to the user in response to receiving the first payment or the initial payment.

16. The computer-executable medium of claim 15, wherein the providing the reduced initial payment option comprises requesting a first payment that is 16% of the total amount to be paid by the user.

17. The computer-executable medium of claim 15, further comprising computer-readable instructions for storing policy information data related to insurance policies.

18. The computer-executable medium of claim 15, further comprising computer-readable instructions for accepting a selection of the reduced initial payment option from the user.

19. The computer-executable medium of claim 15, further comprising computer-readable instructions for providing insurance rate data to the billing module in response to user-specific data.

20. The computer-executable medium of claim 15, further comprising computer-readable instructions for providing insurance rate data to the billing module in response to non-user-specific data.

21. The computer-executable medium of claim 15, further comprising computer-readable instructions for providing a web page graphical interface and displaying an insurance premium payment option to a user via a computer network.

* * * * *